United States Patent
Tyler et al.

(10) Patent No.: US 6,638,316 B1
(45) Date of Patent: Oct. 28, 2003

(54) URL-BASED FACILITY ENABLEMENT

(75) Inventors: Stephen Leslie Tyler, West Pennant Hills (AU); Rodney Bernard James Hardy, West Ryde (AU)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 09/258,192

(22) Filed: Feb. 26, 1999

(30) Foreign Application Priority Data

Mar. 6, 1998 (AU) .............................. PP2218

(51) Int. Cl.⁷ .............................................. G06F 17/00
(52) U.S. Cl. ...................... 715/513; 709/310; 709/328; 709/217; 358/1.15
(58) Field of Search ............................... 709/206, 217, 709/218, 219, 310, 328; 713/200; 358/1.15; 707/513, 501.1; 715/513, 501.1

(56) References Cited

U.S. PATENT DOCUMENTS

| | | | |
|---|---|---|---|
| 5,717,860 A | 2/1998 | Graber et al. | 395/200.12 |
| 5,732,219 A | 3/1998 | Blumer et al. | 395/200.57 |
| 5,828,402 A * | 10/1998 | Collings | 348/460 |
| 5,835,722 A * | 11/1998 | Bradshaw et al. | 709/217 |
| 5,928,363 A | 7/1999 | Ruvolo | 713/201 |
| 5,987,606 A * | 11/1999 | Cirasole et al. | 713/200 |
| 5,996,011 A * | 11/1999 | Humes | 709/206 |
| 6,021,433 A * | 2/2000 | Payne et al. | 709/219 |
| 6,029,182 A * | 2/2000 | Nehab et al. | 707/501.1 |
| 6,061,700 A * | 5/2000 | Brobst et al. | 707/101 |
| 6,184,996 B1 * | 2/2001 | Gase | 358/1.15 |
| 6,199,071 B1 * | 3/2001 | Nielsen | 704/3 |
| 6,269,394 B1 * | 7/2001 | Kenner et al. | 709/217 |
| 6,332,146 B1 * | 12/2001 | Jebens et al. | 707/104.1 |

\* cited by examiner

Primary Examiner—Joseph H. Feild
(74) Attorney, Agent, or Firm—Fitzpatrick, Cella, Harper & Scinto

(57) ABSTRACT

A method for the control of computer facilities, i.e., functions, is disclosed. The method comprises the identification of a computer facility, such as printing, selected for manipulation of data. The method then identifies a source location of the data, for example by examining a uniform reference locator (URL) associated therewith, and then checking whether the source location of the data is valid for the performance of the selected facility. If the source location is not valid, the facility (e.g., printing) is not performed for the data and if the source location is valid, the facility is performed for the data.

27 Claims, 3 Drawing Sheets

URL-BASED FACILITY ENABLEMENT

FIELD OF THE INVENTION

The present invention relates to computer-based facility, i.e., computer-implemented function, enablement and, in particular, to the availability of computer facilities, or functions, based on the location of data sourced from a computer network.

BACKGROUND OF THE INVENTION

Seldom in human history have people adopted a communications technology so widely and rapidly as users of the Internet have embraced the World Wide Web ("the Web").

The Internet provides an ever increasing potential for information interchange and in order to encourage individuals to take part in this communications revolution, many software providers supply free demonstration versions of their software on-line, sometimes called Free-ware and Share-ware. Individuals may dial-up the home page of a supplier and access the demonstration software for trial purposes. This may even involve down-loading the software onto the personal computer of the individual.

Free-ware and share-ware are attractive forms of software in marketing. However, one drawback in supplying software in this manner is that many never actually subscribe to buy the full version of the software continuing to utilise the demonstration version, which is sometimes powerful in its own right. Many software providers are therefore discouraged to provide demonstration versions of their software on-line.

There are several existing programs for controlling user access on the Internet. These tools are commonly known in the art as "Net Nannies" or "Net Daddies" for example. They are used as censorship tools and in some configurations are able to block image files (ie. .gif and .jpg files) and/or totally block access to an Internet web-site. These censorship tools are, however, limited in their use. For example, in some cases text may still be enabled and may well be as provocative as the censored images. In general, such programs merely prevent a user from being provided with certain information.

It is an object of the present invention to substantially overcome, or at least ameliorate, one or more of the problems mentioned above.

SUMMARY OF THE INVENTION

In accordance with one aspect of the present invention there is disclosed a method for the control of computer facilities, i.e., computer-implemented functions, said method comprising the steps of identifying a computer-implemented function selected for manipulation of data, identifying a source location of said data, checking whether the source location of said data is valid for the performance of said selected function, if said source location is not valid, said function is not performed for said data and if said source location is valid, performing said function for said data.

In accordance with another aspect of the present invention there is disclosed a method of controlling a print facility in a computer system forming part of a extended computer network, said method comprising the steps of:

accessing an application program from said network and operating said application program using said computer system to generate a printable document including information obtained from one or more source locations within said network;

identifying a print facility selection using application program called to invoke a printing of said printable document;

identifying the source location of each component of said printable document, and then, for each identified source location; checking whether that source location is a valid one of a predetermined group of source locations and if so, enabling printing of the component corresponding to that source location, and if not, omitting to print the component.

DESCRIPTION OF THE PREFERRED EMBODIMENT

Figure 1:
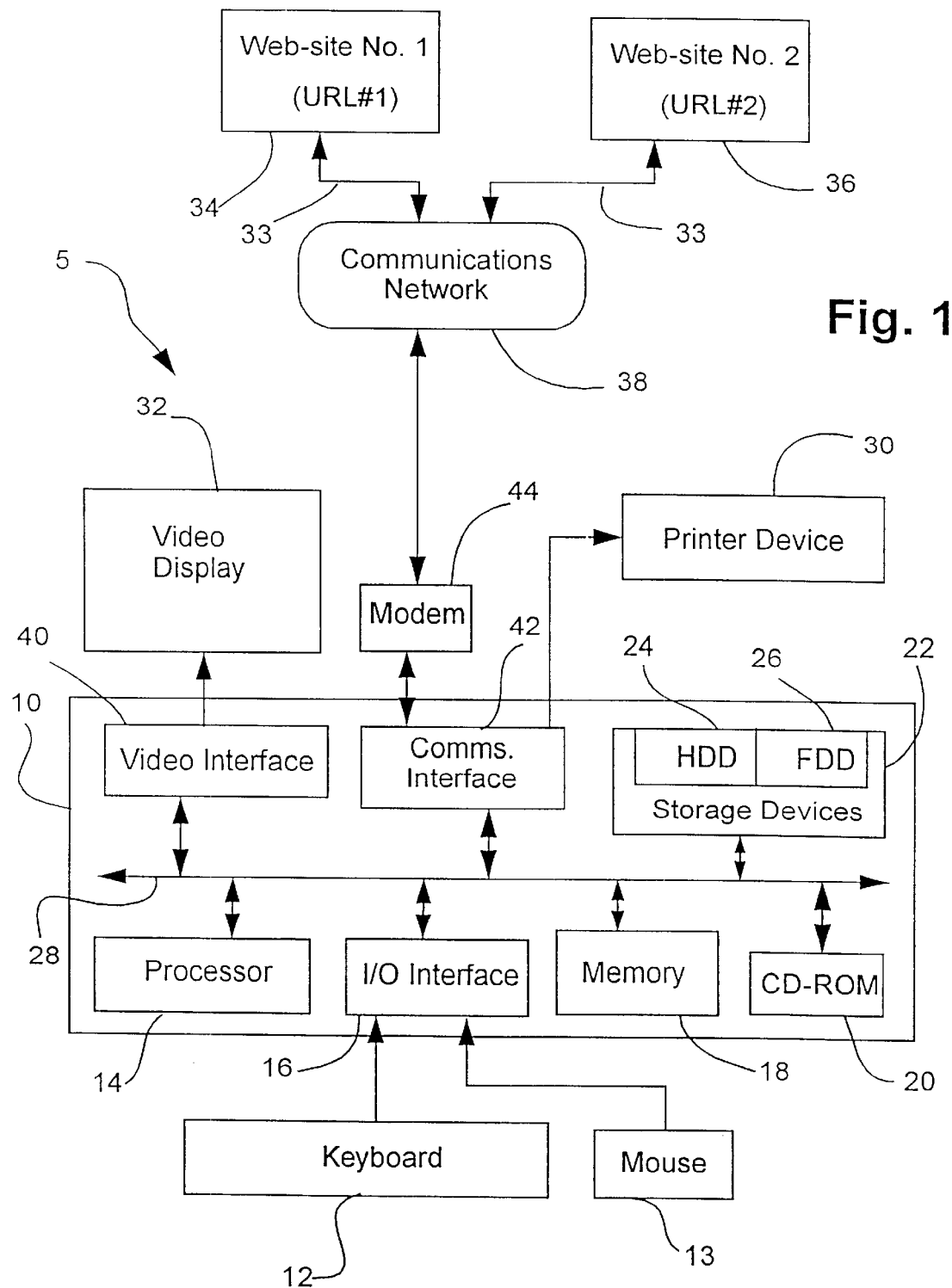
FIG. 1 is a block diagram of a computer system and network with which the preferred embodiment of the present invention can be practised.

Where reference is made in any one or more of the drawings to steps and/or features, which have the same reference numerals, those steps and/or features are for the purposes of the description the same, unless the contrary appears.

In order to access the Internet and traverse the World Wide Web, use is often made of special browsing software such as Microsoft Internet Explorer (Microsoft Corporation) or Netscape Navigator (Netscape Corporation). On entering a web site or some other location, various computer facilities become available to the user in order to manipulate data, programs and the like. Such facilities include the printing of data, copying, running software, listening to audio and receiving video data, amongst others. This may include or result in using Free-ware or Share-ware.

To assist users in being able to track and trace their traversal of the Web, Canon Information Systems Research Australia Pty Ltd has developed a product marketed under the trade mark WebRecord, certain features of which being the subject of U.S. patent application Ser. No. 08/903,743 filed Jul. 31, 1997, pending. WebRecord operates in a background mode behind the browsing software to automatically and substantially transparently create a printable document that includes the various Web sites and documents encountered by a user during a traversal of the Web.

The preferred embodiment of the present invention is implemented as an additional feature in WebRecord and has been developed to facilitate the marketing of WebRecord. However, the present invention is not limited to use with WebRecord or other similar products, but has wider application and may for example be implemented in the browsing software, as will be appreciated by those skilled in the art having read and understood this specification.

The preferred embodiment for controlling the availability of computer facilities based upon the location of data sourced from a computer network is practised using a general-purpose computer system 5 connectable to a communication network 38 which provides links 33 to web sites 34 and 36. The steps in the method of the preferred embodiment are effected by instructions in the software that are carried out by the computer system 50. The software can be divided into two separate parts; one part for carrying out the method of the preferred embodiment; and another part to manage the user interface between the latter and the user. The software may be stored in a computer readable medium, including the storage devices described below, for example. The software is loaded into the computer from the computer readable medium, and then executed by the computer. A computer readable medium having such software or computer program recorded on it is a computer program product. The use of the computer program product in the computer preferably effects an advantageous apparatus for controlling the availability of computer facilities based upon the location of data sourced from a computer network in accordance with the embodiment of the invention. The computer system 5 includes a computer module 10, input devices such as a keyboard 12 and mouse 13, output devices including a printer 30 and a video display device 32. A modulator-demodulator (modem) transceiver device 44 is used by the computer module 10 for communicating to and from computer systems at other locations via the communications network 38, those computer systems for example include the web sites 34 and 36.

The computer module 10 has a number of components typically including at least one processor unit 14, a memory unit 18, for example formed from semiconductor random access memory (RAM) and read only memory (ROM), input/output (I/O) interfaces including a video interface 40, an I/O interface 42 for the keyboard 12 and mouse 13 and a communications interface 42 for the modem 44. A storage device 22 is provided and typically includes a hard disk drive 24 and a floppy disk drive 26. A CD-ROM drive 20 is typically provided as a non-volatile source of data. The components of the computer module 10, typically communicate via an interconnected bus 28 and in a manner which results in a conventional mode of operation of the computer system known to those in the relevant art. Examples of such computer systems 5 include IBM PC/AT and similar machines, Sun Sparksations and Apple Macintosh. Further, the web-sites 34 and 36 may be implemented on such computer systems. The foregoing are merely exemplary of the types of computers with which the embodiment of the invention can be practiced. Typically, the processes of the embodiment, described hereinafter, are resident as software or a program recorded on a hard disk drive (generally depicted as block 24 in FIG. 1) as the computer readable medium, and read and controlled using the processor 14. Intermediate storage of the program from the network can be accomplished using the semiconductor memory 18, possibly in concert with the hard disk drive 24.

In some instances, the program can be supplied to the user encoded on a CD-ROM or a floppy disk (both generally depicted by block 20), or alternatively it can be read by the user from the network via a modem device connected to the computer, for example. Still further, the software can also be loaded into the computer system 5 from other computer readable medium including magnetic tape, a ROM or integrated circuit, a magneto-optical disk, a radio or infra-red transmission channel between the computer and another device, a computer readable card such as a PCMCIA card, and the Internet and Intranets including email transmissions and information recorded on websites and the like. The foregoing are merely exemplary of relevant computer readable mediums. Other computer readable mediums it can be practiced without departing from the scope and spirit of the invention.

The preferred method for controlling the availability of computer facilities based upon the location of data sourced from a computer network can alternatively be implemented in dedicated hardware such as one or more integrated circuits performing the functions or sub functions of the steps of the method. Such dedicated hardware can include graphic processors, digital signal processors, or one or more microprocessors and associated memories.

During an Internet or Web browsing session, a user of the computer system 5 enables operation of the browsing software which is typically stored in the hard disk drive 24 and which facilitates communications via the modem to provide a connection to a web-site.

Locations accessible via the communications network 38 are individually addressable using a Uniform Resource Locater (URL), well known in the art. The URL thus may be entered by the user of the computer system 5 to directly access a particular web-site. Alternatively, web-site documents and the like (including search engines) may include hyper-text which, when selected, provide direct links to locations identified by URL's associated with the hyper-text.

Figure 2:
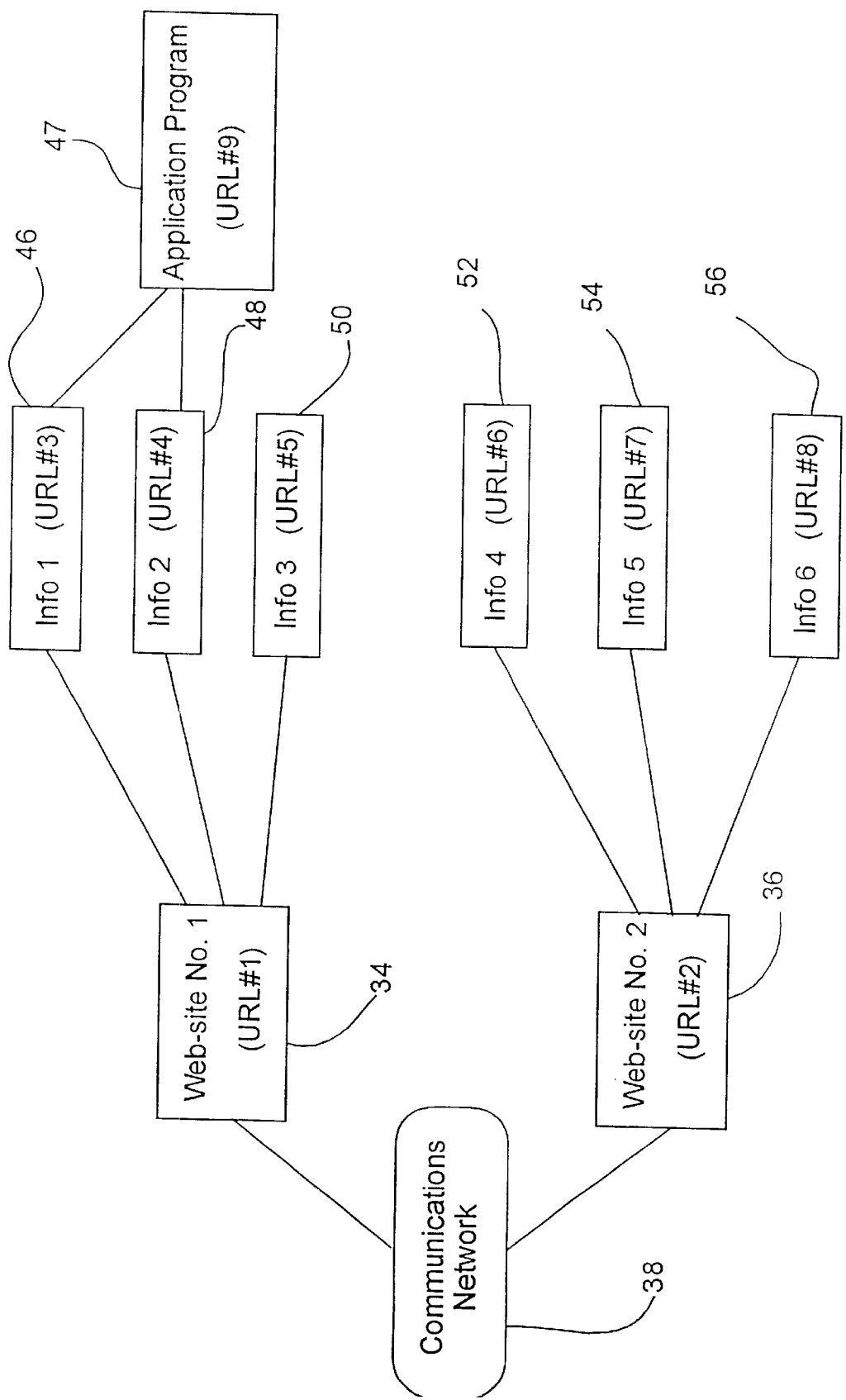
FIG. 2 is a detailed block diagram of two world-wide web site structures.

FIG. 2 shows a block diagram representation of two Internet web-sites 34,36 and their associated URLs. The computer module 10 can access the web-sites 34 and 36 via the modem 44 and communications network 38. The web-sites 34,36 can be accessed through both direct and indirect Internet connections, and through a variety of browsers. As seen in FIG. 2, web-site 34 provides access to information locations 46, 48 and 50 each of which has its own unique URL as illustrated. Similarly, web-site 36 access three information locations 52, 54 and 56 also having respective URL's.

It will be appreciated that the information accessed via the various URL's may include any combination of text, images, graphic objects, programs, raw data such as audio data and video data, for example. It is further seen from FIG. 2 that a location 47, accessible via location 46 or location 48 and having a unique URL (URL #9), includes an application program.

In the preferred embodiment, a demonstration version of WebRecord is made available to the public as the application program 47 and for which persons entering Web-site No. 1 have access. The application program 47 may be downloaded to the user's computer system 5 to enable the demonstration of WebRecord to be undertaken.

In order to prevent the demonstration software from being used over the entire Web, the application program according to the preferred embodiment includes a checking process that provides for the program to be productively used only with respect to the specific web-site from which it is accessed. In the preferred embodiment, productive use permits the printing of the document formed by WebRecord.

For example, assume Web-site No. 1 34 is that of a magazine ABC. The downloading of the WebRecord demonstration version from the location 47 provides that the demonstration version can be used to create on the display 32 a video representation of a printable document of the user's traversal of the Web, which include access to the web-site No. 2 36 (e.g. the U.S. Patent and Trademark Office Web-site), but when printing of the printable document is selected by the user, printing is only enabled for content obtained from web-site No. 1 34 and its derivatives (ie. magazine ABC) and not from any other web-site (e.g. that of the USPTO).

In this fashion, the printing facility of computer system 5 with respect to the WebRecord demonstration version software is enabled only by valid data locations being printed. In the preferred embodiment, this is performed by an examination of the URL(s) associated with the components of the printable document desired to be printed, as will now be described.

Figure 3:
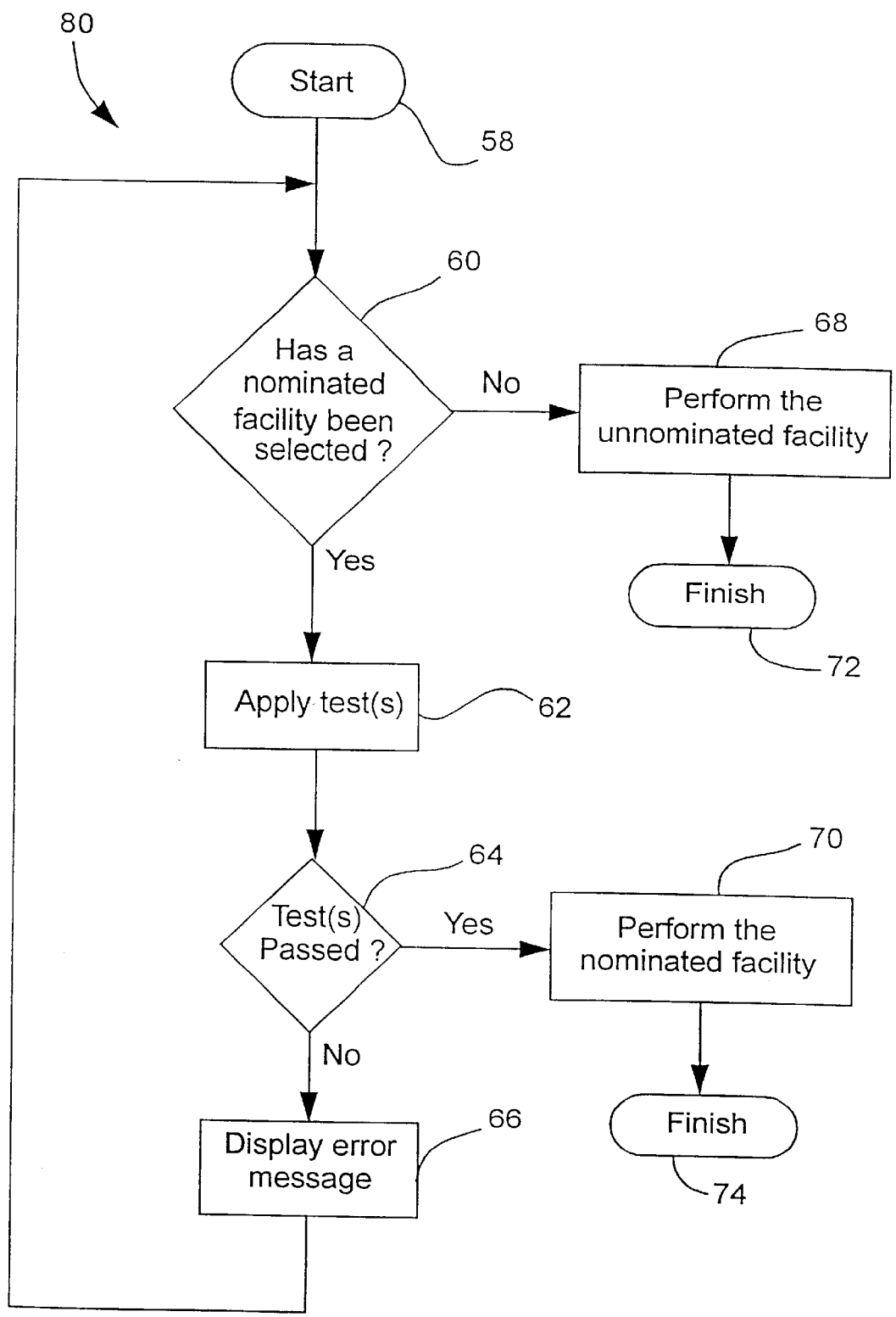
FIG. 3 is a flow chart depicting the, operation of a URL-based facility enablement system of the preferred embodiment.

As seen in FIG. 3, a flowchart of procedures 80 of a URL-based facility enablement system of the preferred embodiment commences at a starting point 58. This entry point leads to a step 60 where a determination is made in software, by the application program as to whether a user selected facility has been pre-nominated as being a restricted access facility. In the described embodiment, such a restricted access facility would be printing. If the result of the determination is negative, then the particular facility is executed at step 68 and the procedure ends at step 72. However, if the result of the determination is positive, then the URL of the data or information being manipulated by the user selected facility, is subjected to a number of tests at step 62. The tests are carried out in software in relation to a number of rules. The rules are used to determine whether or not a particular facility is able to be executed dependent on predetermined criteria. At step 63, a determination is made as to whether the tests have been passed. If the result of this determination is positive then the particular facility is executed at step 70 and the procedure finishes at step 74. However, if the result of the determination is negative then an error message is generated at step 66 and the procedure returns to the beginning.

In the preferred embodiment, the WebRecord demonstration application program creates an internal print list which is stored as a list of records in the memory 18 of the computer system 10, each record being referred hereinafter as a "print item". Each print item typically represents at least one hyper-text document, and comprises a URL by which the associated hyper-text document can be retrieved.

Upon completing their traversal of the web-site 34, a user may select a facility, which is supplied with the application program 47 with which to manipulate the information found. Using the preferred embodiment the application program will then determine through a check-sum whether the print facility has been selected. If the result of this determination is negative (e.g. copying has been selected), as seen at step 60 and step 68 of FIG. 3, the selected facility is executed. However, if the result is positive, then the URL(s) of the item to be printed are subjected to a set of tests, as seen in step 62 of FIG. 3.

The tests 62 implement a number of rules which are pre-determined and pre-configured in a dynamic link library (DLL) which is an executable program file in software. The DLL is typically one library file in the application program 47 of the preferred embodiment. Each web-site will have a unique configuration of rules which will be related to that web-site. The rules are preferably implemented as wildcard variations to one or more URL's for which specific enablement or specific disablement of a particular facility is desired. An example of a rule is as follows:

http://\[^/]*.ABC.\[^/]*\.*

In this rule,

| | |
|---|---|
| http:// | is a generic home page identifier for many URL's; |
| ABC | is a generic URL identifier for an enabled web-site; |
| \. | refers to any character; |
| \[ ] | refers to any character within the character list enclosed by the square brackets; |
| \[^] | refers to any character not within the character list enclosed by the square brackets; |
| * | modifies the preceding operator to be repeated zero or more times for as many times the operator has a successful match; and |
| + | modifies the preceding operator to be repeated one or more times for as many times the operator has a successful match. |

The rules are listed in order of execution and the DLL file preferably contains one or more separate rules. Each rule may be preceded by a "49" character indicating that this rule will act as an exclusion instead of an inclusion. In the process, each candidate URL starts with a negative and proceeds through the rules. Each rule is evaluated against the URL and if the rule results in a match then the mode of the rule is applied to the URL. An exclusion rule will cause the URL to have a negative and an inclusion rule will cause the URL to have a positive. The last rule to successfully match a URL must generate a positive in order for the selected facility to be executed. Therefore, for the above example rule, if the candidate URL does not begin with "http://" followed by a string containing the character sequence ".ABC.", followed by a "/", then a negative response will be generated at step 64 of FIG. 3 and an error message 68 will be displayed. If the result of the determination at step 64 is positive and the candidate URL does contain the required character sequence then the selected facility is executed at step 70 of FIG. 3.

Thus with the above rule, only information obtained from Web-site 34 and its children sites may be printed.

For an alternative example, if URL #1=http://www.ABC.com.au/;

URL #2=http://www.XYZ.com.au/;

URL #3=http://www.ABC.XYZ.com.au/;

URL #4=http://www.ABCXYZ.com.au/;

and it is desired to limit printing to only data that contain ".ABC." but do not contain ".XYZ.", as in URL #1, then the rules would be as follows:

http://\[^/]*.ABC.\[^/]\.*

!http://\[^/]*.XYZ.\[^/]\.*

In this connection, an advantage of the present invention for a software supplier is that the supplier is able to control where a demonstration version of their software is able to be accessed and used. If a user can access the software via one home page (e.g.: the ABC home page) and is impressed with the application program, there is no method for the productive use of the software to another page (e.g. the USPTO home page) other than buying a commercial release of the software. Therefore, the user will be encouraged to purchase a full copy of the software.

A further advantage of the present invention is that individual computer facilities can be disabled or enabled without the need to block a user's access to a web-site or parts thereof. In this way, user manipulation of data can be controlled whilst still allowing a user access to a web-site.

It will be further apparent from the foregoing that the use of URL's to enable or disable computer facilities is not limited to just printing facilities or the WebRecord product. For example, the feature may be used to disable/enable editing functions such as copy, cut or paste, or the downloading of information. For example, the present invention may be used to view directly from a web-site a trailer for feature film, but to prevent the user downloading the trailer to the computer system 5 which would otherwise permit viewing of the trailer when not connected to the web-site.

The foregoing describes only one embodiment of the present invention, and modifications, obvious to those skilled in the art, can be made thereto without departing from the scope of the present invention.

What is claimed is:

1. A method for control of computer-implemented functions, said method comprising the steps of:
    accessing an application program from an extended computer network and operating the application program using a computer system connected to the network;
    identifying a computer-implemented function provided by the application program, the identified function being selected for manipulation of data;
    identifying a source location of the data;
    accessing the data at the identified source location; and
    checking whether the source location of the accessed data is valid for performance of the selected function, such that if the source location is not valid, the function is not performed for the accessed data and if the source location is valid, performing the function for the accessed data, wherein validity of the source location as to performance of the selected function is determined according to one or more predetermined rules associated with the application program, the one or more predetermined rules being configurable for the source location by a supplier of the application program.

2. A method according to claim 1, wherein the source location is a uniform resource locator of data accessible via the computer network.

3. A method according to claim 1, wherein said checking comprises identifying if the source location is one of a group of predetermined source locations for which manipulation by the function of the accessed data is to be enabled.

4. A method according to claim 1, wherein said checking comprises identifying if the source location is one of a group of predetermined source locations for which manipulation by the function of the accessed data is to be disabled.

5. A method according to claim 1, wherein the selected function is a print function for printing the accessed data.

6. A method according to claim 1, wherein the selected function is a display function for audio and/or video reproduction of the accessed data.

7. A method according to claim 1, wherein the selected function is selected from a group consisting of editing functions including cut, paste and copy, downloading and running of software.

8. A method of controlling a print function in a computer system forming part of an extended computer network, said method comprising the steps of:
    accessing an application program from the network and operating the application program using the computer system to generate a printable document including data components accessed from one or more source locations within the network;
    identifying a print function provided by the application program, the print function being called to invoke a printing of the printable document;
    identifying the source location of each accessed data component of the printable document, and then, for each identified source location, checking whether that source location is a valid one of a predetermined group of source locations and if so, enabling printing of the accessed data component corresponding to that source location, and if not, omitting to print the accessed data component, wherein validity of the source location as to enabling the printing is determined according to one or more predetermined rules associated with the application program, the one or more predetermined rules being configurable for the source location by a supplier of the application program.

9. A method according to claim 8, wherein the source location is defined by a uniform resource locator (URL) used in an Internet.

10. An apparatus for the control of computer-implemented functions, said apparatus comprising:
    processor means for accessing an application program from an extended computer network and executing the application program on a computer system connected to the network;
    identifying means for identifying a computer-implemented function provided by the application program, the identified function being selected for manipulation of data;
    identifying means for identifying a source location of the data;
    accessing means for accessing the data at the identified source location; and
    checking means for checking whether the source location of the accessed data is valid for the performance of the selected function such that if the source location is not valid, the function is not performed for the accessed data and if the source location is valid, performing the function for the accessed data, wherein validity of the source location as to performance of the selected function is determined according to one or more predetermined rules associated with the application program, the one or more predetermined rules being configurable for the source location by a supplier of the application program.

11. An apparatus according to claim 10, wherein the source location is a uniform resource locator of data accessible via the computer network.

12. An apparatus according to claim 10, wherein said checking comprises identifying if the source location is one of a group of predetermined source locations for which manipulation by the function of the accessed data is to be enabled.

13. An apparatus according to claim 10, wherein said checking comprises identifying if the source location is one of a group of predetermined source locations for which manipulation by the function of the accessed data is to be disabled.

14. An apparatus according to claim 10, wherein the selected function is a print function for printing the accessed data.

15. An apparatus according to claim 10, wherein the selected function is a display function for audio and/or video reproduction of the accessed data.

16. An apparatus according to claim 10, wherein the selected function is selected from a group consisting of editing functions including cut, paste and copy, downloading and running of software.

17. An apparatus for controlling a print function in a computer system forming part of an extended computer network, said apparatus comprising:
    accessing means for accessing an application program from the network and operating the application program using the computer system to generate a printable document including data components obtained from one or more source locations within the network;
    identifying means for identifying a print function provided by the application program, the print function being called to invoke a printing of the printable document;
    identifying means for identifying the source location of each data component of the printable document, and then, for each identified source location, checking means for checking whether that source location is a valid one of a predetermined group of source locations and if so, enabling printing of the data component corresponding to that source location, and if not, omitting to print the component, wherein validity of the source location as to enabling the printing is determined according to one or more predetermined rules associated with the application program, the one or more predetermined rules being configurable for the source location by a supplier of the application program.

18. An apparatus according to claim 17, wherein the source location is defined by a uniform resource locator (URL) used in an Internet.

19. A computer program stored in a computer readable medium, said computer program being configured for controlling computer-implemented functions, said computer program comprising:
  code for accessing an application program from an extended computer network and executing the application program on a computer system connected to the network;
  code for identifying a computer-implemented function provided by the application program, the identified function being selected for manipulation of data;
  code for identifying a source location of the data;
  code for accessing the data at the identified source location; and
  code for checking whether the source location of the accessed data is valid for the performance of the selected function, such that if the source location is not valid, the function is not performed for the accessed data and if the source location is valid, performing the function for the accessed data, wherein validity of the source location as to performance of the selected function is determined according to one or more predetermined rules associated with the application program, the one or more predetermined rules being configurable for the source location by a supplier of the application program.

20. A computer program according to claim 19, wherein the source location is a uniform resource locator of data accessible via the computer network.

21. A computer program according to claim 19, wherein said checking comprises identifying if the source location is one of a group of predetermined source locations for which manipulation by the function of the accessed data is to be enabled.

22. A computer program according to claim 19, wherein said checking comprises identifying if the source location is one of a group of predetermined source locations for which manipulation by the function of the accessed data is to be disabled.

23. A computer program according to claim 19, wherein the selected function is a print function for printing the accessed data.

24. A computer program according to claim 19, wherein the selected function is a display function for audio and/or video reproduction of the accessed data.

25. A computer program according to claim 19, wherein the selected function is selected from the group consisting of editing functions including cut, paste and copy, downloading and running of software.

26. A computer program stored in a computer readable medium, said computer program being configured for controlling a print function in a computer system forming part of an extended computer network, said computer program comprising:
  code for accessing an application program from the network and operating the application program using the computer system to generate a printable document including data components obtained from one or more source locations within the network;
  code for identifying a print function provided by the application program, the print function being called to invoke a printing of the printable document;
  code for identifying the source location of each data component of the printable document, and then, for each identified source location, code for checking whether that source location is a valid one of a predetermined group of source locations and if so, enabling printing of the data component corresponding to that source location, and if not, omitting to print the component, wherein validity of the source location as to enabling the printing is determined according to one or more predetermined rules associated with the application program, the one or more predetermined rules being configurable for the source location by a supplier of the application program.

27. An computer program according to claim 26, wherein the source location is defined by a uniform resource locator (URL) used in an Internet.

* * * * *

UNITED STATES PATENT AND TRADEMARK OFFICE
CERTIFICATE OF CORRECTION

PATENT NO. : 6,638,316 B1
DATED : October 28, 2003
INVENTOR(S) : Stephen Leslie Tyler et al.

It is certified that error appears in the above-identified patent and that said Letters Patent is hereby corrected as shown below:

Column 1,
Line 20, "dial-up" should read -- dial up --.
Line 36, "(ie." should read -- (i.e., --; and
Line 61, "a" (second occurrence) should read -- an --.

Column 2,
Line 14, "practised;" should read -- practiced; --;
Line 42, "trade mark" should read -- trademark --; and
Line 60, "practised" should read -- practiced --.

Column 3,
Line 53, "medium" should read -- mediums --.

Column 4,
Line 25, "access" should read -- accesses --; and
Line 53, "include" should read -- includes --.

Column 10,
Line 45, "An" should read -- A --.

Signed and Sealed this

Twenty-seventh Day of July, 2004

JON W. DUDAS
*Acting Director of the United States Patent and Trademark Office*